(12) United States Patent
Wong

(10) Patent No.: US 6,448,116 B1
(45) Date of Patent: Sep. 10, 2002

(54) THIN FILM TRANSISTOR DISPLAY AND METHOD OF FABRICATION

(75) Inventor: Jia-Fam Wong, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 18 days.

(21) Appl. No.: 09/828,857

(22) Filed: Apr. 10, 2001

(30) Foreign Application Priority Data

Sep. 29, 2000 (TW) .......................................... 089120205

(51) Int. Cl.7 .......................... H01L 21/84; H01L 27/01
(52) U.S. Cl. ...................... 438/155; 438/151; 257/347; 257/350
(58) Field of Search ............................... 438/155, 151, 438/152, 166; 257/347, 350

(56) References Cited

U.S. PATENT DOCUMENTS

| | | | | |
|---|---|---|---|---|
| 5,466,617 A | * | 11/1995 | Shannon ...................... | 438/155 |
| 5,705,413 A | * | 1/1998 | Harkin et al. ................ | 438/155 |
| 5,798,534 A | * | 8/1998 | Young ......................... | 257/347 |
| 6,207,480 B1 | * | 3/2001 | Cha et al. .................... | 438/155 |

* cited by examiner

Primary Examiner—Kevin M. Picardat
(74) Attorney, Agent, or Firm—Winston Hsu

(57) ABSTRACT

A thin film transistor (TFT) display and a method of fabricating the same are disclosed. The display is formed on a substrate, and the substrate includes a transistor area for forming a transistor, and a pad area for forming a pad. The first step of the method is to form a gate electrode and a pad electrode on the transistor area and the pad area, respectively. Then, an insulating layer is deposited on the substrate and has a pad opening to expose the pad electrode. Next, a semiconductor layer, a doped silicon conductive layer, and a second metal layer are deposited, respectively, above the insulating layer. Then, a channel area is defined in the transistor area by removing portions of the second metal layer and the doped silicon layer within the channel area and outside the transistor area. The remaining second metal layer in the transistor area forms a source metal layer and a drain metal layer. A patterned passivation layer is formed to expose the semiconductor layer outside the transistor area. Finally, the first insulating layer is exposed outside the transistor area and the pad electrode is exposed within the pad opening after etching away the unprotected portions of the semiconductor layer and the insulating layer.

25 Claims, 10 Drawing Sheets

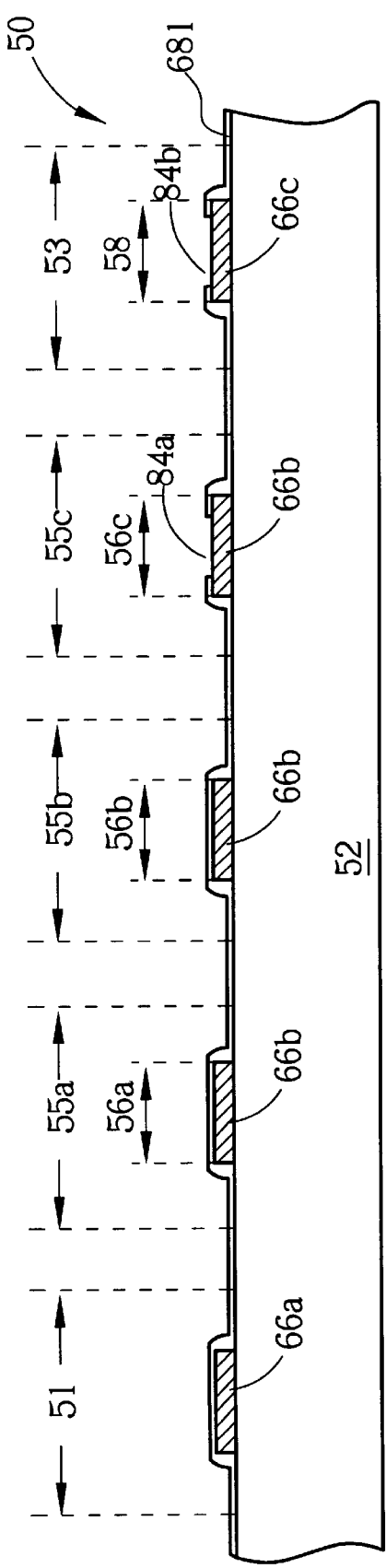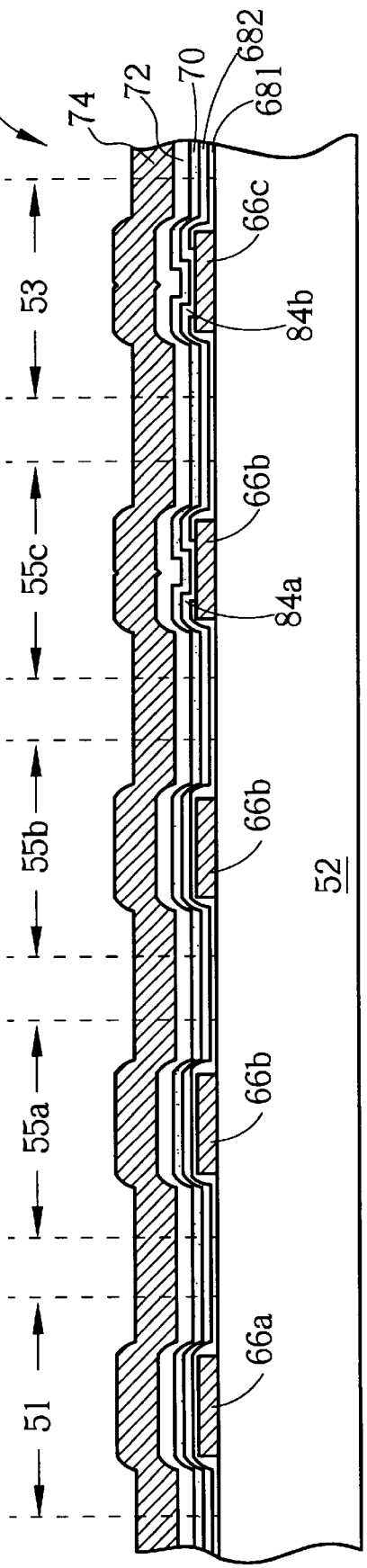

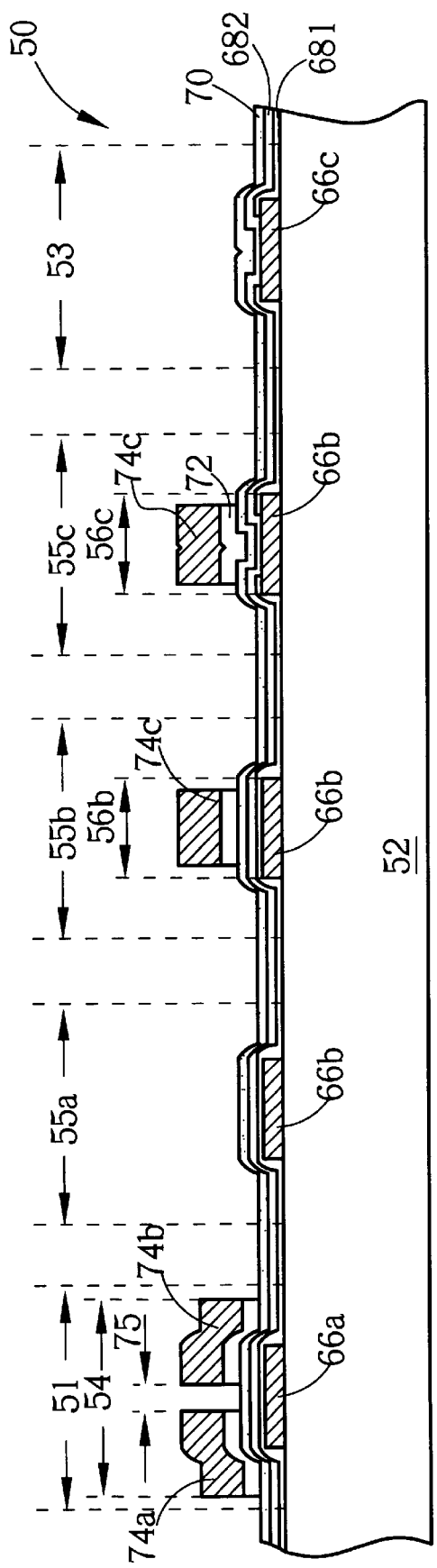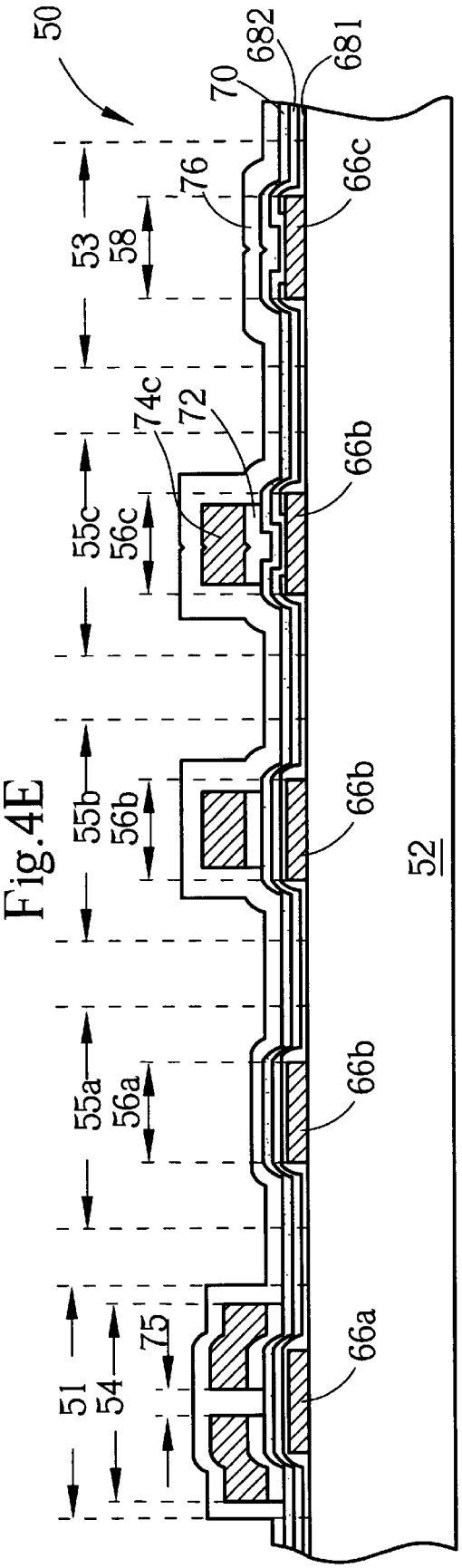

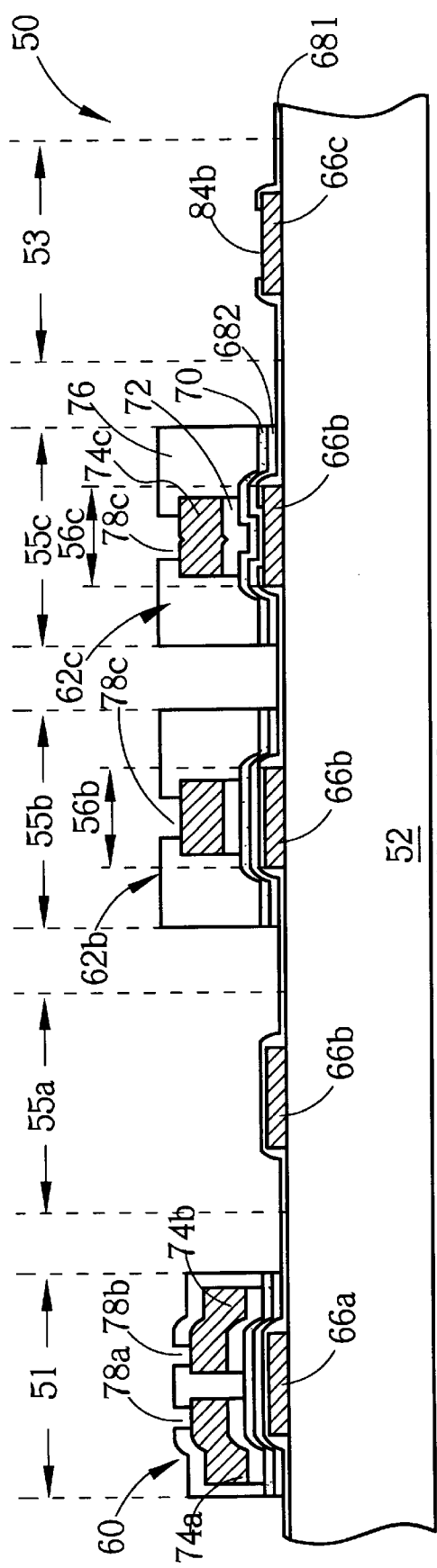
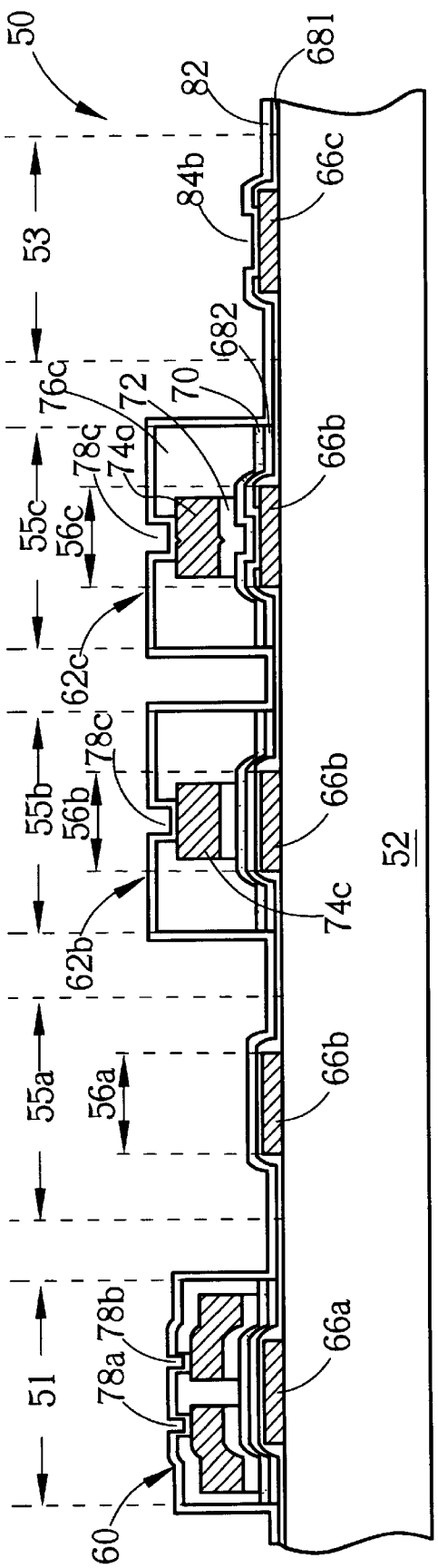
Fig.4G
Fig.4H

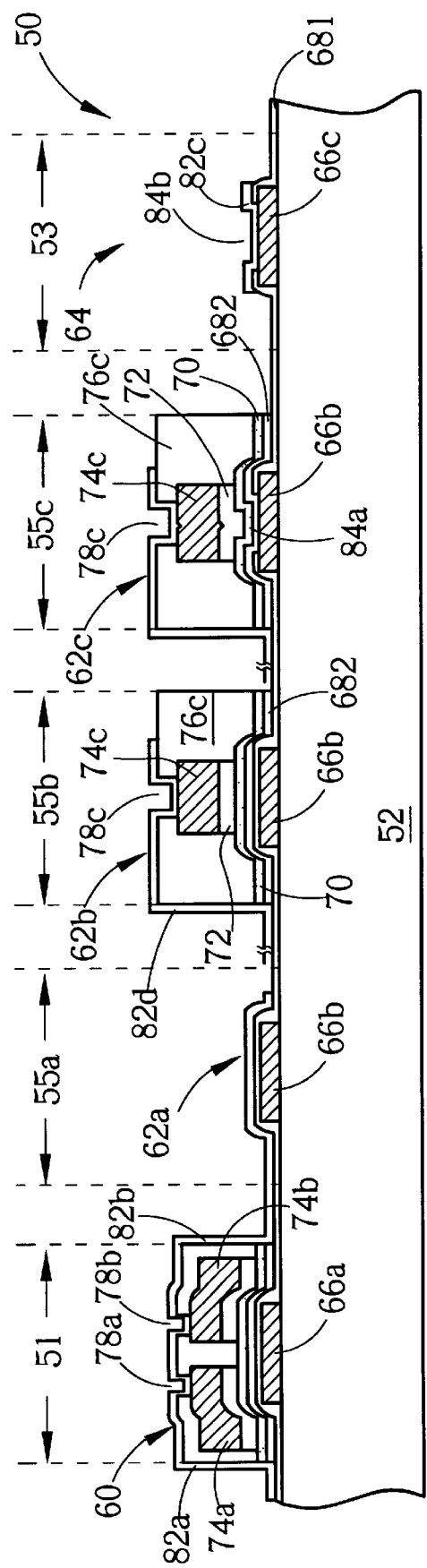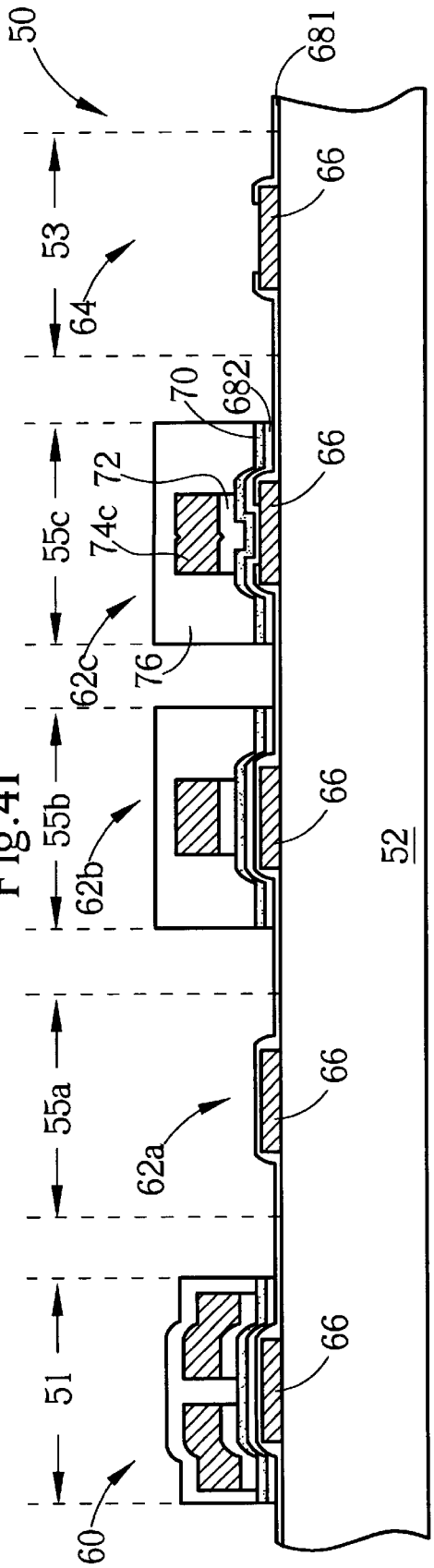

THIN FILM TRANSISTOR DISPLAY AND METHOD OF FABRICATION

BACKGROUND OF THE INVENTION

1. Field of the Invention

The present invention relates to a thin film transistor display and a method of fabricating the same.

2. Description of the Prior Art

A thin film transistor display, such as a thin film transistor liquid crystal display (TFT-LCD), utilizes a lot of thin film transistors are arranged in a matrix as switches for driving liquid crystal molecules to produce brilliant images after co-operating with other elements such as capacitors and bonding pads. The advantages of the TFT-LCD include the portability, low power consumption, and low radiation. Therefore, the TFT-LCD is widely used in various portable products, such as notebooks, personal data assistants (PDA), etc. Moreover, the TFT-LCD replaces the CRT monitor in desktop computers gradually.

Please refer to FIG. 1A to FIG. 1H of schematic diagrams of a prior art method for fabricating a transistor of a TFT-LCD 10. In the prior art, the transistor of the TFT-LCD 10 is formed on the surface of a glass substrate 12. As shown in FIG. 1A, an aluminum (Al) layer 14 and a cap layer 16 are first deposited on the substrate 12, respectively. Next, the Al layer 14 and the cap layer 16 are patterned by a first photo-etching process (PEP) to form a gate electrode.

Then, as shown in FIG. 1B, an insulating layer 18, an amorphous silicon layer 20, and a doped amorphous silicon layer 22 are deposited on the glass substrate 12. As shown in FIG. 1C, a second photo-etching process is used to remove the portion of the doped amorphous silicon layer 22 and the amorphous silicon layer 20 outside the transistor area 24. The insulating layer 18 is then exposed outside the transistor area 24. As shown in FIG. 1D, a metal layer 26 is deposited on the glass substrate 12. As shown in FIG. 1E, a third PEP is performed to pattern the metal layer 26. Further, the doped amorphous silicon layer 22 is etched by using the metal layer 26 as a hard mask, the remaining doped amorphous silicon layer 22 and the metal layer 26 are used to form a source metal layer 28 and a drain metal layer 30, respectively.

As shown in FIG. 1F, after the third PEP, a passivation layer 32 is deposited on the glass substrate 12. Then, as shown in FIG. 1G, a fourth PEP process is performed to define the pattern of the passivation layer 32 and form a drain opening 34 above the drain metal layer 30. Next, an indium tin oxide (ITO) layer 36 is deposited on the glass substrate 12 and fills in the drain opening 34. Finally, as shown in FIG. 1H, a fifth PEP is!performed to form the pattern of the ITO layer 36 so that the drain metal layer 30 is electrically connected to a display region (not shown). The transistors are used to control the brightness of the TFT-LCD 10.

The prior art method of fabricating the TFT-LCD 10 requires at least five photo-etching processes to form a transistor. The method is complicated, expensive, and time-consuming, resulting in a low yield of the TFT-LCD. Besides, each TFT-LCD includes many other electronic components, and these components will be affected when the yield of the TFT-LCD is low. Thus, the fabrication of the related electronic components must be integrated into a single process for cost-saving and make the TFT-LCD can compete with the low-cost CRT monitors.

SUMMARY

It is therefore a primary objective of the present invention to provide a new method of fabricating a thin film transistor display to solve the above-mentioned problem.

In a preferred embodiment, the present invention provides a method for fabricating a thin film transistor display. The thin film transistor display is fabricated on a substrate having a first region and a second region. The first region comprises a transistor area for the formation of a transistor, and the second region comprises a pad area for the formation of a pad. A first metal layer is deposited on the substrate and then patterned to form a gate electrode in the transistor area and a pad electrode in the pad area. Then, a first insulating layer is formed and patterned. The first insulating layer includes a pad opening formed in the pad area to expose the pad electrode. Further, a second insulating layer, a semiconductor layer, a doped silicon conductive layer, and a second metal layer are deposited on the first insulating layer. A channel area is defined in the transistor area, and then, removing portions of the second metal layer and the doped silicon layer positioned (1) outside the transistor area and (2) within the channel area. The remaining second metal layer forms a source metal layer and a drain metal layer at the transistor area. The source and drain metal layers are separated by the channel area, and the semiconductor layer is exposed outside the transistor area. Further, a passivation layer is deposited and patterned on the substrate. The portion of the passivation layer outside the first region is removed to expose the semiconductor layer outside the first region. Finally, by using the passivation layer as an etching mask, the semiconductor layer and the second insulating layer unprotected by the passivation layer is removed. The first insulating layer is therefore exposed outside the first region, and the pad electrode is exposed in the pad opening.

It is an advantage of the present invention that a method of fabricating a thin film transistor display can produce different kinds of capacitors as well as reduce the resistance of both transistors and capacitors under the same process condition.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWING

FIG. 4A to FIG. 4I are schematic diagrams of a third embodiment of the present invention method for fabricating a TFT-LCD.

FIG. 5 is a schematic diagram of a fourth embodiment of the present invention method for fabricating a TFT-LCD.

DETAILED DESCRIPTION OF THE PREFERRED EMBODIMENT

Figure 1A:
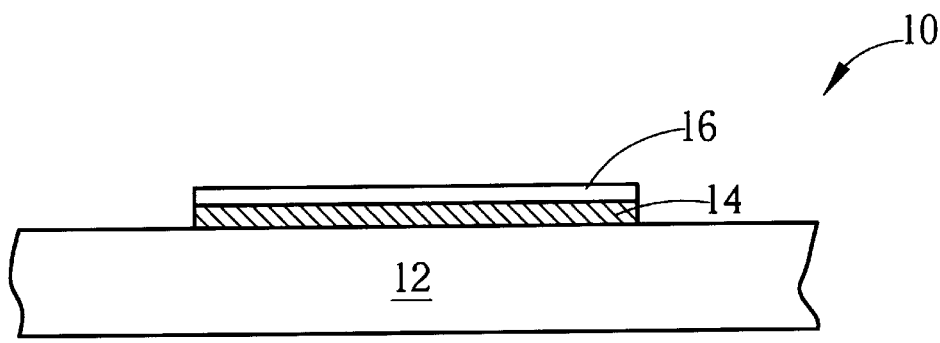
FIG. 1A to FIG. 1H are schematic diagrams of a prior art method for fabricating transistors of a TFT-LCD.
Figure 1B:
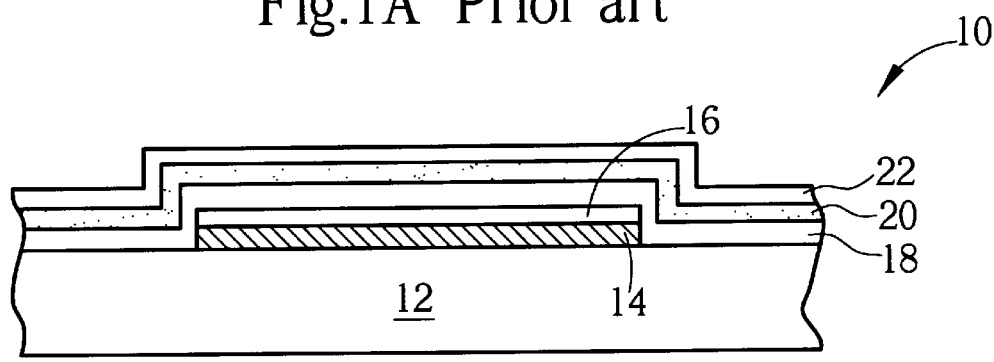
Figure 1C:
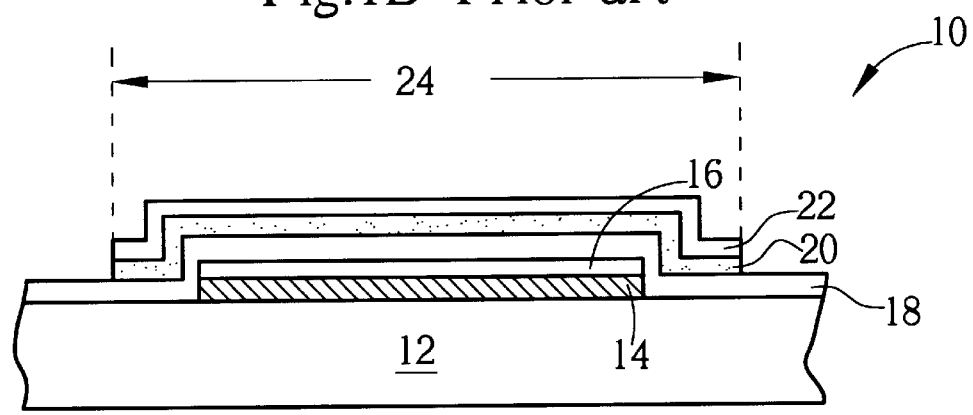
Figure 1D:
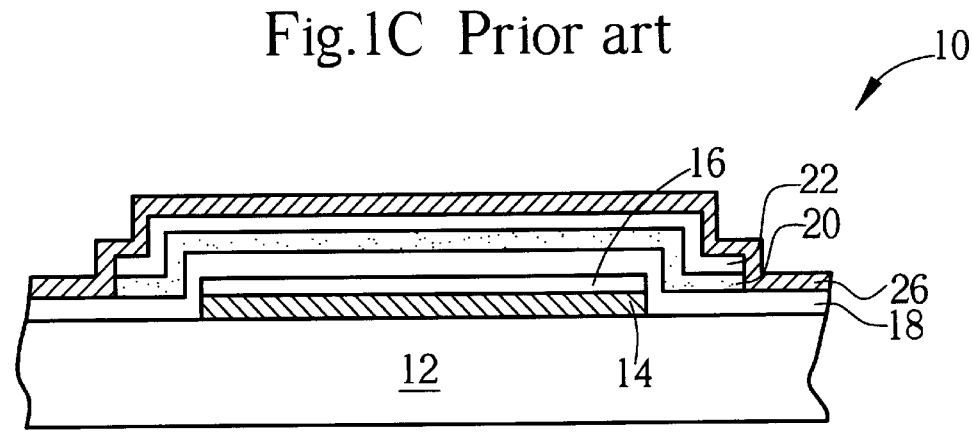
Figure 1E:
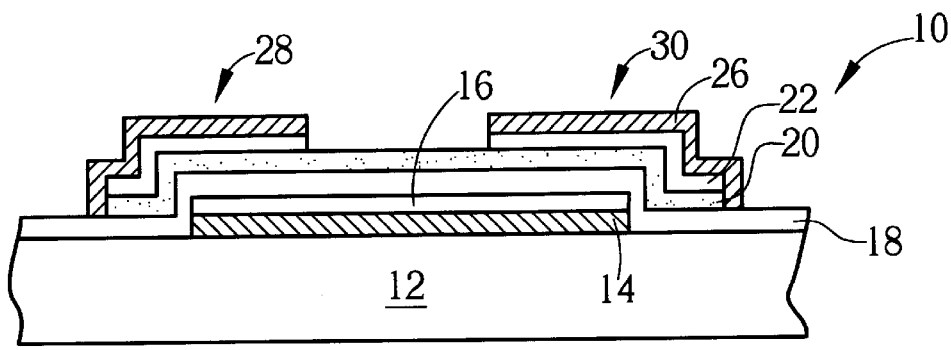
Figure 1F:
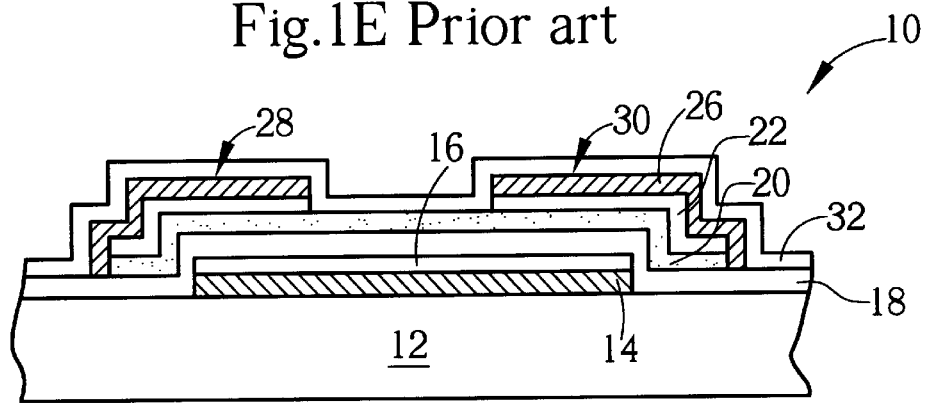
Figure 1G:
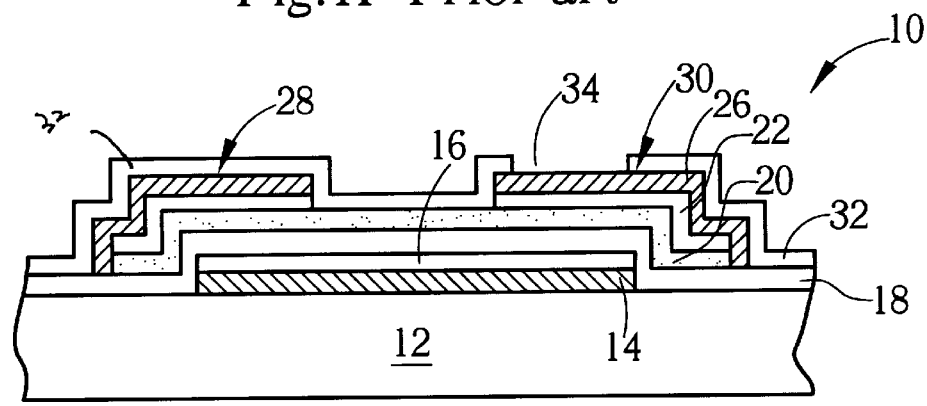
Figure 1H:
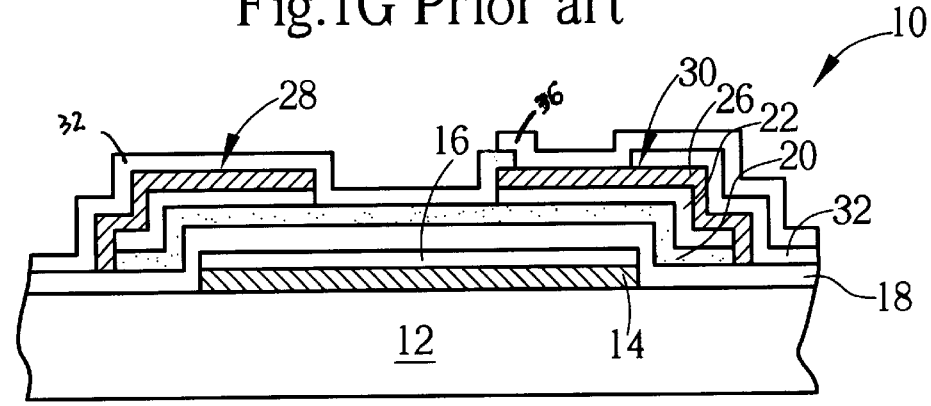

Please refer to FIG. 2A to FIG. 2G which are the schematic diagrams of the method for fabricating the thin-film transistor display according to the present invention. In this preferred embodiment, the present invention is a thin film transistor liquid crystal display (TFT-LCD)50. The TFT-LCD 50 is formed on the surface of the substrate 52. The substrate 52 comprises at least a first region 51, a second region 53, and a third region 55. The first region 51 comprises a transistor area 54 for the formation of a transistor 60, the third region 55 comprises a capacitor area 56 for the formation of a capacitor 62, and the second region 53 comprises a pad area 58 for the formation of a pad 64.

Figure 2A:
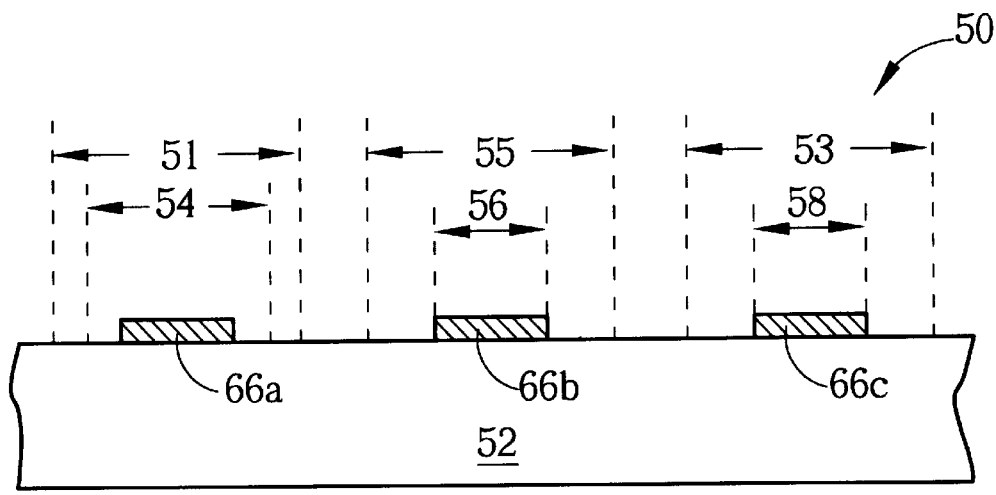
FIG. 2A. to FIG. 2G are schematic diagrams of a first embodiment of the present invention method for fabricating a TFT-LCD.

According to the present invention, a metal layer 66 is first deposited on the surface of the substrate 52. As shown in FIG. 2A, the pattern of the metal layer 66 is then defined to form a gate electrode 66a in the transistor area 54, a capacitor bottom electrode 66b in the capacitor area 56, and a pad electrode 66c in the pad area 58.

Figure 2B:
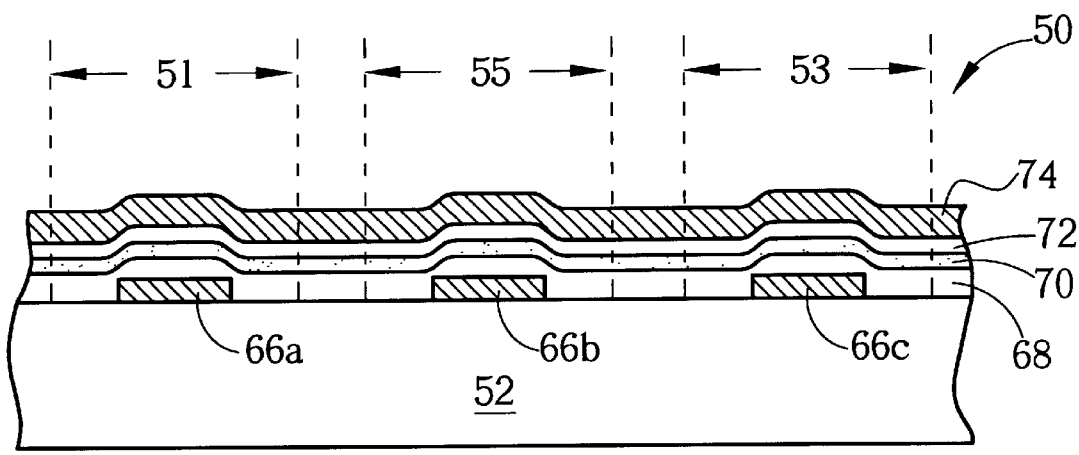

As shown in FIG. 2B, an insulating layer 68, a semiconductor layer 70, a doped silicon layer 72, and a metal layer 74 are deposited, respectively, on the substrate 52. The semiconductor layer 70 can be made of a polysilicon layer or an amorphous silicon layer, depending on the process condition or the size of the display area.

Figure 2C:
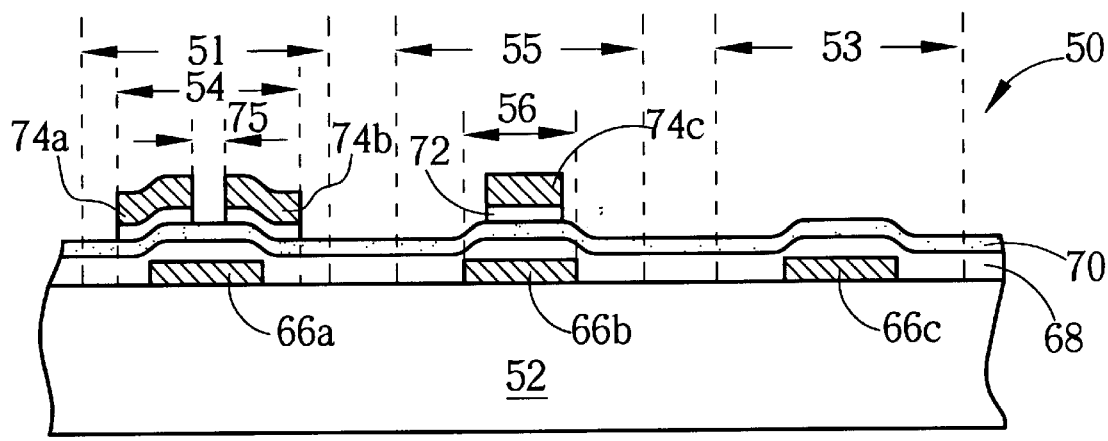

As shown in FIG. 2C, the insulating layer 68, the semiconductor layer 70, the doped silicon conductive layer 72, and the metal layer 74 are then patterned. A channel area 75 is first defined in the transistor area 54, then removing portions of both the doped silicon layer 72 and the metal layer 74 positioned (1) outside the transistor area 54 and inside the channel area 75 of the first region 51, (2) inside the second region 53, and (3) in the third region 55 which is not covered by the capacitor bottom electrode 66b. Therefore, the remaining metal layer 74 forms a source metal layer 74a and a drain metal layer 74b in the transistor area 54, and forms a capacitor top electrode 74c in the capacitor area 56. The source metal layer 74a and the drain metal layer 74b are separated by the channel area 75, and the semiconductor layer 70 is exposed in the regions outside the transistor area 54 and outside the capacitor area 56.

Figure 2D:
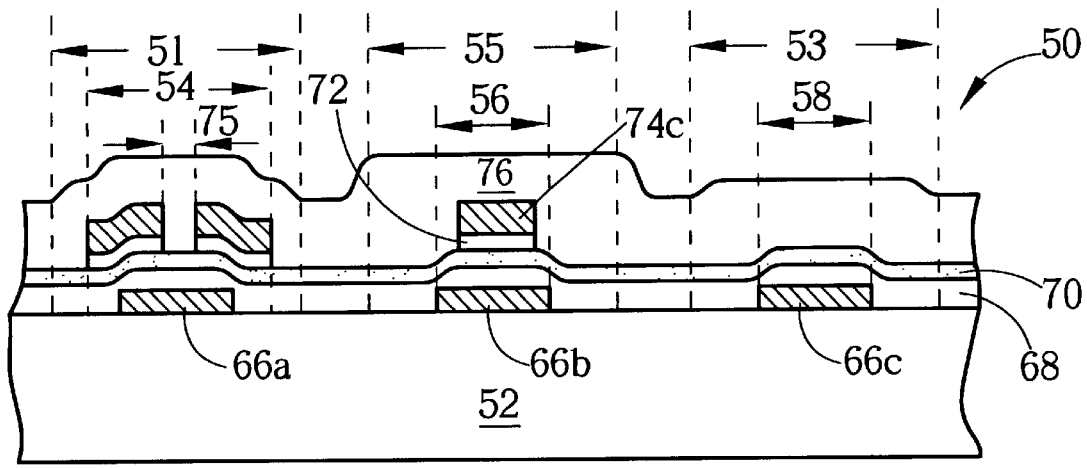

Secondly, as shown in FIG. 2D, a passivation layer 76 is deposited on the semiconductor layer 70 and the metal layer 74. The passivation layer 76 covers the transistor layer 54, the capacitor layer 56, the pad area 58, and also fills in the channel area 75.

Figure 2E:
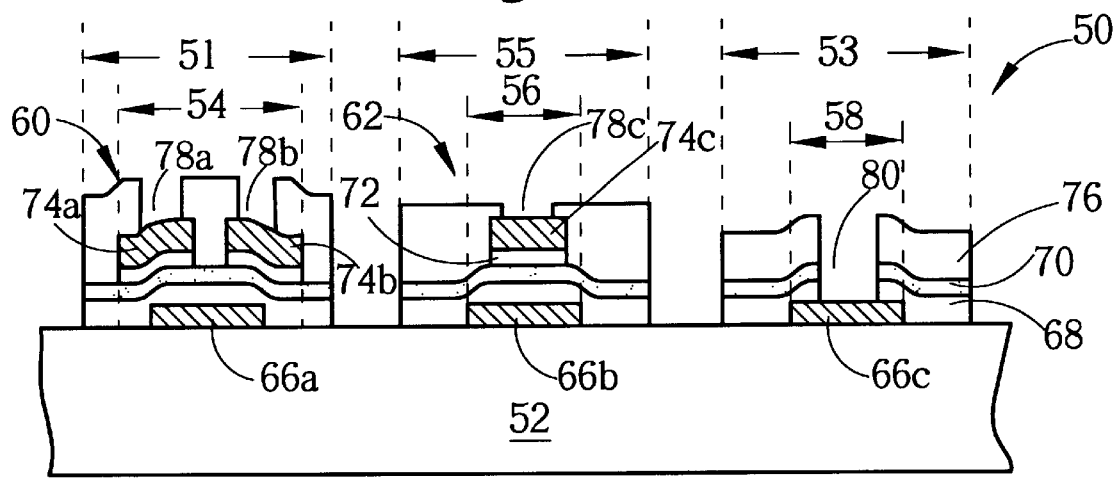

The passivation layer 76 is then patterned. As shown in FIG. 2E, a source opening 78a is defined above the source metal layer 74a, a drain opening 78b is defined above the drain metal layer 74b, a capacitor opening 78c is defined in the capacitor area 56, and a pad opening 80 is defined in the pad area 58. Further, the following portions of the passivation layer 76 are removed: (1) outside the first region 51, the second region 53, and the third region 55, and (2) within the source opening 78a, the drain opening 78b, the capacitor opening 78c, and the pad opening 80. The semiconductor layer 70 is therefore exposed outside the first region layer 51, the second region layer 53, and the third region layer 55 and inside the pad opening 80. Also, the source metal layer 74a, the drain metal layer 74b, and the capacitor top electrode 74c are also exposed in the source opening 78a, the drain opening 78b, and the capacitor opening 78c, respectively.

The passivation layer 76 then functions as an etching mask to remove the portions of the semiconductor layer 70 and the insulating layer 68 unprotected by the passivation layer 76.

Therefore, the following portions of the semiconductor layer 70 and the insulating layer 68 will be removed: (1) outside the first region 51, the second region 53, and the third region 55, and (2) within the pad opening 80. Thus, (1) the glass substrate 52 is exposed outside the first region 51, the second region 53, and the third region 55, and (2) the pad electrode 66c is exposed within the pad opening 80. Then, a transistor 60 and a capacitor 62 are manufactured completely.

Figure 2F:
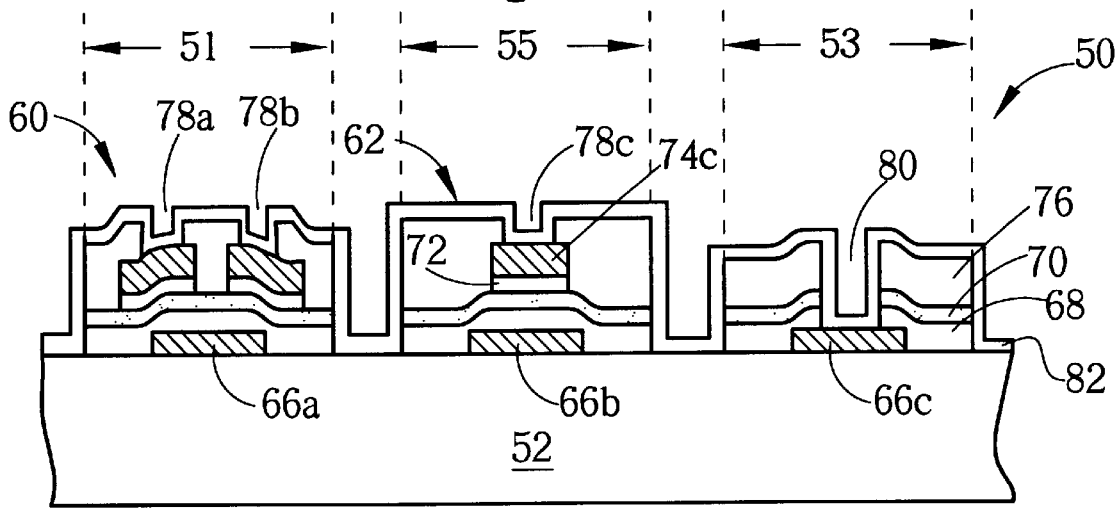

Then, as shown in FIG. 2F, a transparent conductive layer 82 is deposited on the substrate 52. The transparent conductive layer 82, usually made of indium tin oxide (ITO), fills into the source opening 78a, the drain opening 78b, the capacitor opening 78c, and the pad opening 80 for electrically connecting to the source metal layer 74a, the drain metal layer 74b, the capacitor top electrode 74c, and the pad electrode 66c, respectively.

Figure 2G:
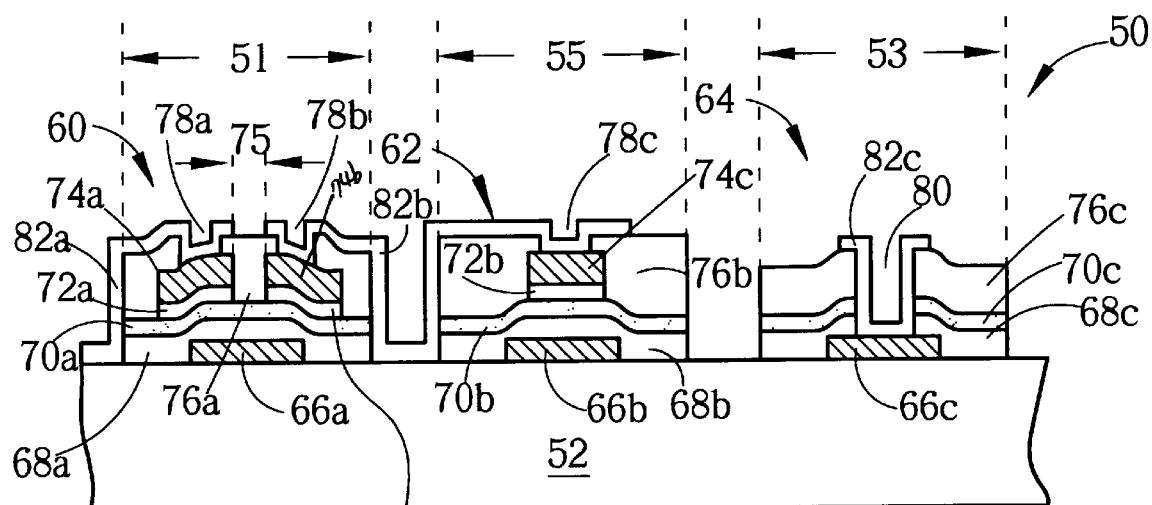

Finally, as shown in FIG. 2G, the transparent conductive layer 82 is patterned and divided into three electrically isolated parts including: a source block 82a, a drain block 30 82b, and a pad block 82c. The source block 82a is electrically connected to the source metal layer 74a via the source opening 78a. The drain block 82b is electrically connected to the drain metal layer 74b via the drain opening 78b and to the capacitor top electrode 74c via the capacitor opening 78c. The pad block 82c is electrically connected to the pad electrode 66c via the pad opening 80. Thereafter, the transparent conductive layer 82 is electrically connected to the transistor 60 and capacitor 62.

The fabrication of the TFT-LCD 50 therefore requires only four photo-etching processes. The structure of the TFT-LCD 50 includes the substrate 52, the thin film transistor 60, the capacitor 62, and the pad 64 used as a gate bonding pad.

As shown in FIG. 2G, the thin film transistor 60 includes a gate electrode 66a formed on the substrate 52, a transistor insulating layer 68a and a transistor semiconductor layer 70a formed on the gate electrode 66a. A first doped silicon layer 72a and a second doped silicon layer 72b are further formed on the transistor semiconductor layer 70a, and separated by a channel area 75. Then, a source conductive layer 74a is formed on the first doped silicon layer 72a while a drain conductive layer 74b is formed on the second doped silicon layer 72b. Finally, a transistor passivation layer 76a covers the channel area 75, the source metal layer 74a, and the drain metal layer 74b.

In the transistor 60, the sidewall of the transistor insulating layer 68a is aligned with the sidewall of the transistor semiconductor layer 70a. The sidewall of the source metal layer 74a is aligned with the sidewall of the first doped silicon layer 72a while the sidewall of the drain metal layer 74b is aligned with the sidewalls of the second doped silicon layer 72b. In addition, the sidewall of the source metal layer 74a and the drain metal layer 74b are spaced apart from the sidewall of the insulating layer 70a.

The capacitor 62 comprises a capacitor bottom electrode 66b in common with the gate electrode 66a and covered by a capacitor insulating layer 68b. A capacitor semiconductor layer 70b, a capacitor doped silicon layer 72c, a capacitor top electrode 74c, and a capacitor passivation layer 76b are formed on the capacitor insulating layer 68b. A transparent conductive layer 82b further covers the capacitor passivation layer 76b. The capacitor passivation layer 76b has a capacitor opening 78c, and the capacitor top electrode 74c is exposed in the capacitor opening 78c. The transparent conductive layer 82b can then fill in the capacitor opening 78c and is electrically connected to the capacitor top electrode 74c.

The gate pad includes a pad electrode 66c formed on the substrate 52 and electrically connected to the gate electrode 66a. A pad insulating layer 68c, a pad semiconductor layer 70c, and a pad passivation layer 76c surround the boundary of the pad electrode 66c to form a pad opening 80. The pad opening 80 penetrates the pad passivation layer 76c, the pad semiconductor layer 70c, and the pad insulating layer 68c, so that the pad electrode 66c is exposed in the pad opening 80. Besides, a transparent conductive layer 82c fills in the pad opening 80 to electrically connect with the pad electrode 66c.

The transistor passivation layer 76a has a source opening 78a above the source metal layer 74a, and a drain, opening 78b above the drain metal layer 78b. The TFT-LCD 50 further comprises a transparent source conductive layer block 82a, a transparent drain conductive layer block 82b, and a transparent pad conductive layer block 82c. The transparent source conductive layer block 82a connects to the source conductive layer 74a via the source opening 78a, the transparent drain conductive layer block 82b connects to the drain conductive layer 74b via the drain opening 78b, and the transparent pad conductive layer block 82c connects to the pad electrode 66c via the pad opening 80.

Figure 3A:
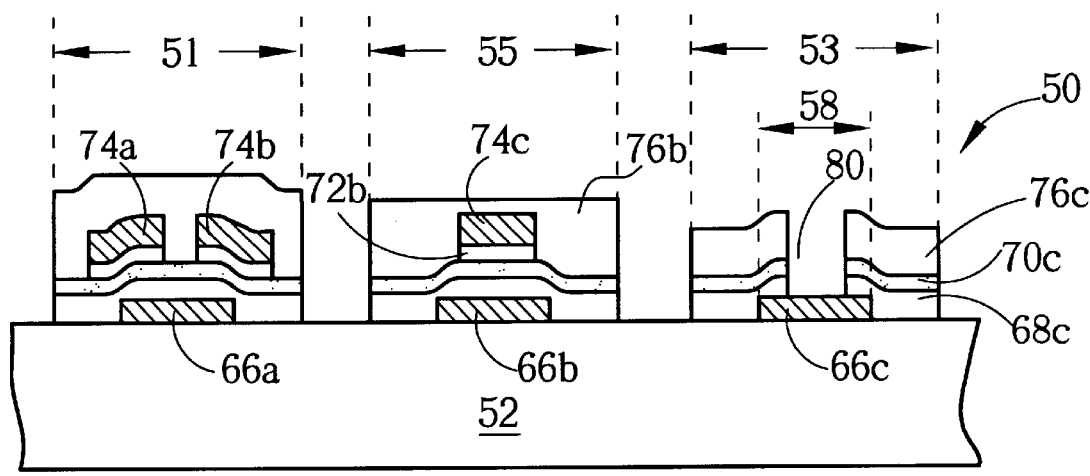
FIG. 3A to FIG. 3B are schematic diagrams of a second embodiment of the present invention method for fabricating a TFT-LCD.
Figure 3B:
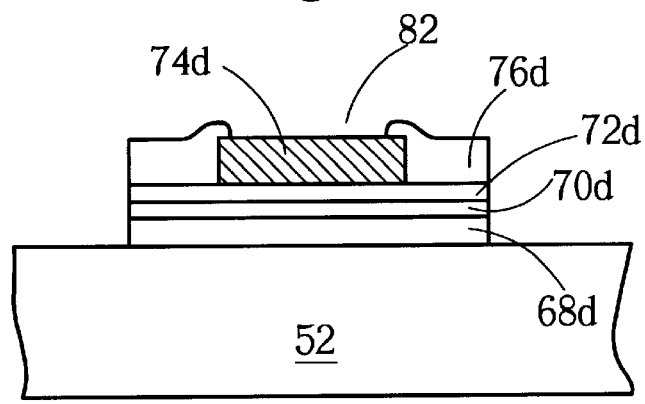

Please refer to FIG. 3A and FIG. 3B. which are the schematic diagrams of the second embodiment in the present invention. The second embodiment can be applied to an in-plain-switch (IPS) type TFT-LCD. The second embodiment requires only three photo-etching processes (PEPs), and the first two steps are the same as these in the first embodiment. In the other word, the steps shown in FIG. 2A to FIG. 2D will be performed before the process shown in FIG. 3A.

There is no transparent conductive layer for light transmission in the IPS type TFT-LCD. The IPS type TFT-LCD directly utilizes a metal layer as the driving electrode. Thus, as shown in FIG. 3A, the final step of the second embodiment is to remove portions of the passivation layer 76, the semiconductor layer 70, and the insulating layer 68 positioned (1) outside the first region 51, the second region 53, and the third region 55, and (2) within the pad area 58 to form a pad opening 80.

The above-mentioned liquid crystal display also includes a gate line and a signal line intercrossed with the gate line (both are not shown). The gate line is connected to the gate electrode 66a and the pad electrode 66c. A signal bonding pad is position at the end of the signal line, which cross-sectional figure is shown as FIG. 3B. In FIG. 3B, an insulating layer 68d, a semiconductor layer 70d, and a doped silicon layer 72d are formed, respectively, on the substrate 52. A second metal layer 74d is formed in a predetermined area of the doped silicon layer 72d, and a passivation layer 76d covers both the second metal layer 74d and the doped silicon layer 72d. Further, an opening 82 is formed above the second metal layer 74d, and the second metal layer 74d is exposed and can be electrical connected with the outer circuit (not shown).

The structure of the second embodiment is similar to the first embodiment in the present invention. The major difference between the two embodiments includes: (1) there is no transparent conductive layer in the second embodiment, and (2) the passivation layer 76 does not have openings at the position above the source metal layer 74a, drain metal layer 74b, or the capacitor top electrode 74c.

Figure 4A:
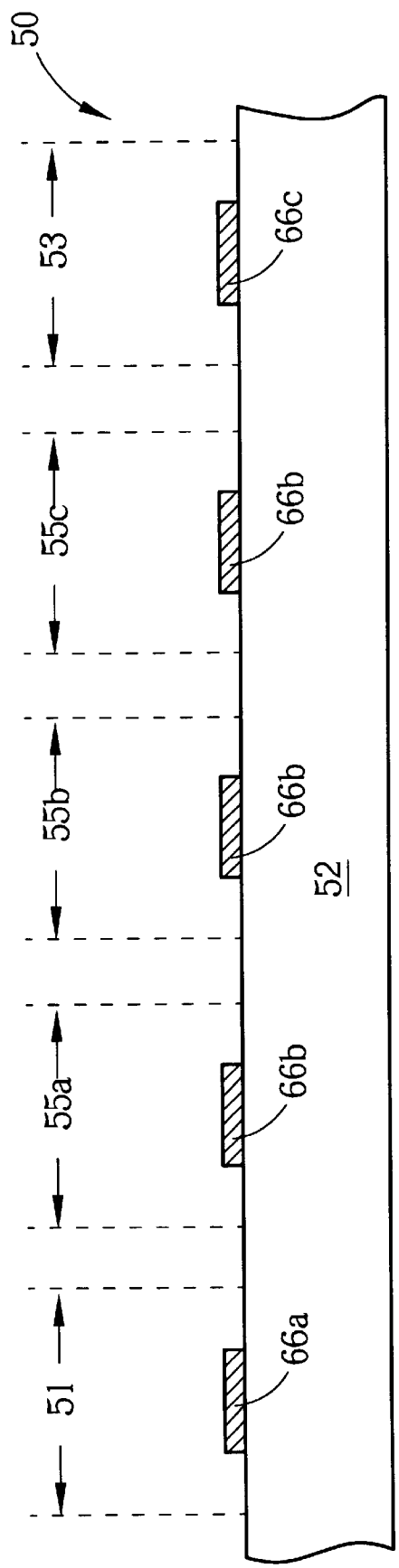

Please refer to FIG. 4A to FIG. 4I which are the schematic diagrams of the third embodiment according to the present invention. In the third embodiment, three different kinds of capacitors can be fabricated in three regions 55a, 55b, and 55c. As shown in FIG. 4A, a metal layer 66 is first deposited on the substrate 52, and patterned by a first photo-etching process (PEP-III-1) to form a gate electrode 66a, a capacitor bottom electrode 66b, and a pad electrode 66c.

Figure 4B:
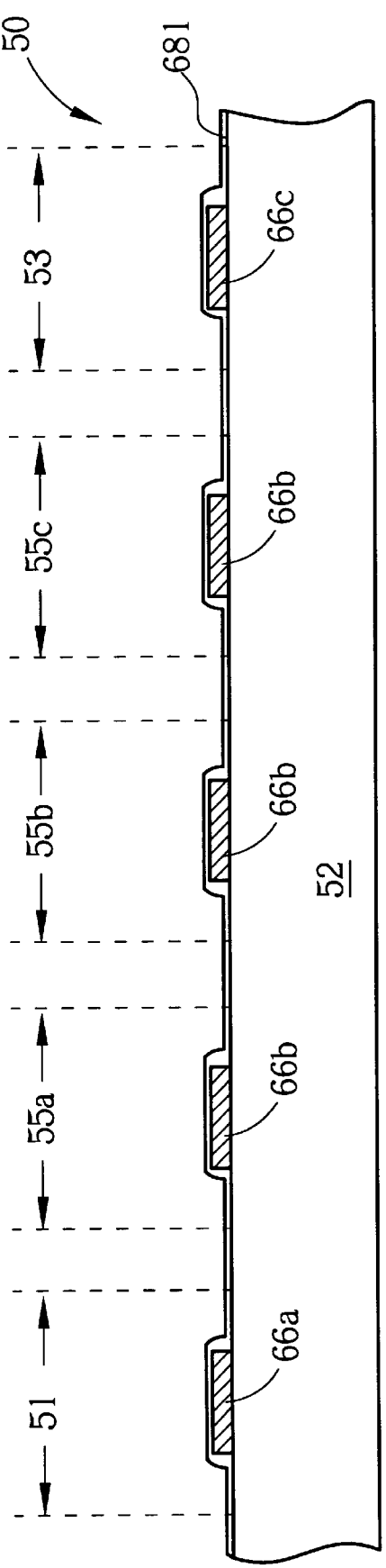

As shown in FIG. 4B, an first insulating layer 681 is deposited on the substrate 52. The insulating layer 681 is then patterned by a second photo-etching process (PEP-III-2). As shown in FIG. 4C, a capacitor insulating layer opening 84a is formed in capacitor area 56c to expose the capacitor bottom electrode 66b, and a pad opening 84b is formed in pad area 58 to expose the pad electrode 66c.

As shown in FIG. 4D, an second insulating layer 682, a S semiconductor layer 70, a doped silicon layer 72, and a second metal layer 74 are sequentially formed on the substrate 52. The second insulating layer 682 fills both the capacitor insulating layer opening 84a and the pad opening 84b. The total thickness of the first insulating layer 681 and the second insulating layer 682 of this embodiment is equal to the thickness of the insulating layer 68 of the first embodiment so that the structure of the transistor 60 remains unchanged.

As shown in FIG. 4E, the pattern of the insulating layer 682, the semiconductor layer 70, the doped silicon layer 72, and the metal layer 74 are then defined by a third photo-etching process(PEP-III-3). First, a channel area 75 is defined in the transistor area 54, and then removing both the second metal layer 74 and the doped silicon layer 72 positioned (a) within the channel area 75, and (b) outside the transistor area 54, and capacitor areas 56b and 56c. The remaining metal layer 74 therefore forms a source metal layer 74a and a drain metal layer 74b in the transistor area 54, and also forms capacitor top electrodes 74c in the capacitor areas 56b and 56c. The source metal and the drain metal layer is separated by the channel area 75. Thus, the semiconductor layer 70 is exposed outside the transistor area 54, the capacitor area 56b, and the capacitor area 56c.

Moreover, as shown in FIG. 4F, a passivation layer 76 is deposited to cover the first region 51, the second region 53, the third regions 55b, 55c, the transistor area 54, the capacitor areas 56a, 56b and 56c, and the pad area 58, as well as filled into the channel area 75.

As shown in FIG. 4G, the passivation layer 76 is then patterned by a fourth photo-etching process(PEP- III -4). Portions of the passivation layer 76 outside the first region 51 and the third regions 55b and 55c are removed to expose the semiconductor layer 70 in the second region 53 and the third region 55a. Concurrently, a source opening 78a is defined above the source metal layer 74a, a drain opening 78b is defined above the drain metal layer 74b, and capacitor openings 78c are defined in the capacitor areas 56b and 56c. Then, portions of the passivation layer 76 are then removed within the source opening 78a, the drain opening 78b, and the capacitor opening 78c. Therefore, the source metal layer 74a is exposed in the source opening 78a of the transistor area 54, the drain metal layer 74b is exposed in the drain opening 78b, the insulating layer is exposed in the capacitor area 66b, and the capacitor top electrodes 74c are exposed in the capacitor openings 78c.

The passivation layer 76 is then used as an etching mask to remove the unprotected portions of the semiconductor layer 70 and the insulating layer 682. Therefore, the insulating layer 681 is exposed outside the first region 51, and the third regions 55b and 55c. In other words, the insulating layer 681 is exposed in the second region 53 and the third region 55a. Further, the pad electrode 66c is exposed in the pad opening 84b, and the fabrication of the transistor 60 and the capacitor 62b is thus completed.

The pad opening 84b shown in FIG. 4C can be formed by the second PEP (PEP-III-2) or after the fourth PEP(PEP-III-4), in other words, the second PEP(PEP-III-2) can be performed after the fourth PEP(PEP-III-4)

As shown in FIG. 4H, a transparent conductive layer 82 is formed on the substrate 52 to cover the capacitor areas 56a, 56b and 56c, as well as fill in the source opening 78a, the drain opening 78b, the capacitor opening 78c, and the pad opening 84b.

Finally, as shown in FIG. 4I, the transparent conductive layer 82 is patterned by a fifth photo-etching process (PEP-III-5). Therefore, the transparent conductive layer 82 is separated into at least three electrical-isolated parts including the source block 82a, the drain block 82b, and the pad block 82c. The source block 82a is electrically connected to the source metal layer 74a via the source opening 78a, the drain block 82b is electrically connected to the drain metal layer 74b via the drain opening 78b, the pad block 82c is electrically connected to the pad electrode 66c via the pad opening 84b, and the transparent conductive layer 82 is electrically connected to the capacitor top electrode 74c. Besides, the transparent conductive layer 82 is electrically connected to the transistor 60 and each capacitor after the fabrication of the capacitor 62a and the pad 64 is completed.

The transistor of the third embodiment is similar to that of the first embodiment, but the structures of the gate pad and the capacitor are different. As shown in FIG. 4I, the gate pad of the third embodiment includes a pad electrode 66c, a pad insulating layer 681, and a pad block 82c of the transparent conductive layer. The pad electrode 66c is formed on the substrate 52 and electrically connected to the gate electrode 66a, the pad insulating layer 681 surrounds the boundary of the pad electrode 66c to form a pad opening 84b, and the pad opening 84b is penetrated through the pad insulating layer 681 to expose the pad electrode 66c. The pad block 82c is electrically connected to the pad electrode 66c via the pad opening 84b.

Three different kinds of capacitor structures are formed in the third embodiment. The capacitor 62a includes a capacitor bottom electrode 66b common with the gate electrode 66a, a insulating layer 681 covering the capacitor bottom electrode 66b, and the transparent conductive layer 82b covering the insulating layer 681 and functions as a capacitor top electrode.

The capacitor 62b includes the capacitor bottom electrode 66b common with the gate electrode 66a, the insulating layer 681 covering the capacitor bottom electrode 66b, and the insulating layer 682 as well as the semiconductor layer 70 covering the insulating layer 681. Further, the doped silicon layer 72, the capacitor top electrode 74c, and the capacitor passivation layer 76c are formed on the semiconductor layer 70. The capacitor passivation layer 76c is covered by a transparent conductive layer 82d. In addition, the capacitor passivation layer 76c includes a capacitor opening 78c to expose the capacitor top electrode 74c. The transparent conductive layer 82d fills in the capacitor opening 78c and electrically connects to the capacitor top electrode 74c.

The capacitor 62c is also similar to the capacitor 62b. The major difference between these capacitors 62c and 62b is that the capacitor 62c has the insulating opening 84a in the insulating layer 681 to expose the capacitor bottom electrode 66b, and the insulating layer 682 will fill into the insulating opening 84a. Therefore, the distance between the capacitor top electrode 74c and the capacitor bottom electrode 66b is smaller for resulting an increased capacitor value in the capacitor 62c.

Please refer to FIG. 5 which is the schematic diagram according to the fourth embodiment. This embodiment can be applied to an in-plain-switch (IPS) type TFT-LCD. The fourth embodiment of the present invention combines features of the second and third embodiments to form various different kinds of capacitors without using the transparent conductive layer because the IPS type TFT-LCD doesn't require the transparent conductive layer. Similarly, the first three steps of the fourth embodiment are the same as those of the third embodiment, a half-finished product as shown in FIG. 4F is manufactured.

As shown in FIG. 5, portions of the passivation layer 76, the semiconductor layer 70, and the insulating layer 682 positioned (1) outside the first region 51, and (2) outside the third regions 55b and 55c are removed in the fourth photo-etching process of the fourth embodiment. The fabrication of the transistor 60, the capacitors 62b, 62c, and the pad 64 are then completed. There is no transparent conductive layer, therefore, the above method can be used in the fabrication of the IPS type TFT-LCD. In addition, a metal wire 62a, rather than a capacitor, is formed in the third region 55a.

The major difference between the fourth embodiment and the third embodiment includes (1) the passivation layer 76 of the fourth embodiment lacks the openings above the source conductive layer 74a, the drain conductive layer 74b, and the capacitor top electrode 74c, and (2) no transparent conductive layer is formed in the fourth embodiment.

The feature of the present invention is to deposit the metal layer 74 above the doped silicon layer 72 for reducing the resistance of the transistor 60 and the capacitor 62, and increasing the operation rate. In the IPS type TFT-LCD, no transparent conductive layer 82 is needed, resulting in a reduction in both the resistance and the cost of the display. Another advantage of the present invention is the increased flexibility in circuit design since the same process can be used to manufacture different kinds of capacitors without affecting the structure of the transistor 60 and the pad 64 or changing the area of the capacitor area 66.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of fabricating a thin film transistor display, the thin film transistor display being fabricated on a substrate, the substrate comprising a first region and a second region, the first region comprising a transistor area for manufacturing a transistor and the second region comprising a pad area for manufacturing a pad, the method comprising:

(a) depositing a first metal layer on the surface of the substrate;

(b) patterning the first metal layer to form a gate electrode in the transistor area and a pad electrode in the pad area;

(c) forming a first insulating layer on the substrate and patterning the first insulating layer to form a pad opening thereon in the pad area, the pad electrode being exposed in the pad opening;

(d) depositing a second insulating layer, a semiconductor layer, a doped silicon layer, and a second metal layer, respectively, on the first insulating layer;

(e) defining a channel area in the transistor area, removing portions of the second metal layer and the doped silicon layer outside the transistor area and within the channel area, forming a source metal layer and a drain metal layer by the remaining second metal layer in the transistor area, the source and drain metal layers being separated by the channel area, and the semiconductor layer being exposed outside the transistor area;

(f) depositing a passivation layer on the substrate; and (g) patterning the passivation layer by removing a portion of the passivation layer outside the first region to expose the semiconductor layer outside the first region, and then using the passivation layer as an etching mask to remove a portion of the semiconductor layer and the second insulating layer uncovered by the passivation layer, so that the first insulating layer outside the first region being exposed and the pad electrode being exposed in the pad opening.

2. The method of claim 1 wherein the substrate further comprises a capacitor area for forming a capacitor, the method comprising:

forming a capacitor bottom electrode in the capacitor area during the step (b) for patterning the first metal layer;

defining a source opening above the source metal layer and a drain opening above the drain metal layer during the step (g) for patterning the passivation layer, and the source and drain metal layers being exposed in the transistor area after removing the passivation layer within the source and drain opening, the first insulating layer being exposed in the capacitor area after the step (g);

(h) forming a transparent conductive layer on the substrate covering the capacitor area, and filling in the source opening, the drain opening, and the pad opening; and (i) patterning the transparent conductive layer to separate the transparent conductive layer into a plurality of electrically isolated parts including a source block, a drain block, and a pad block, the source block being electrically connected with the source metal layer via the source opening, the drain block being electrically connected with the drain metal layer via the drain opening, the pad block being electrically connected with the pad electrode via the pad opening, and a capacitor top electrode being further formed in the capacitor area by the transparent conductive layer.

3. A method of fabricating a thin film transistor display, the thin film transistor display being fabricated on a substrate having a first region, a second region, and a third region, the first region comprising a transistor area for forming a transistor, the second region comprising a pad area for forming a pad, and the third region comprising a capacitor area for forming a capacitor, the method comprising the steps of:

(a) depositing a first metal layer on the surface of the substrate;

(b) patterning the first metal layer to form a gate electrode in the transistor area, a capacitor bottom electrode in the capacitor area, and a pad electrode in the pad area;

(c) forming a first insulating layer on the substrate and defining the pattern of the first insulating layer to form a pad opening in the pad area to expose the pad electrode in the pad opening;

(d) depositing a second insulating layer, a semiconductor layer, a doped silicon layer, and a second metal layer, respectively, above the first insulating layer;

(e) defining a channel area in the transistor area, removing portions of the second met layer and the doped silicon layer within the channel area and outside the transistor and capacitor area, forming a source metal layer and a drain metal layer in the transistor are and a capacitor top electrode in the capacitor area by the remaining second metal layer, the source and drain metal layers being separated by the channel area, and the semiconductor layer being exposed outside both the transistor area and capacitor area;

(f) depositing a passivation layer on the substrate to cover the transistor area, the capacitor area, the pad area, and the passivation layer filling into the channel area; and (g) patterning the passivation layer, defining a source opening above the source metal layer, a drain opening above the drain metal layer, and a capacitor opening in the capacitor area, then removing portions of the passivation layer outside the first and third region, and within the source, drain, and capacitor opening for allowing the semiconductor layer being exposed outside the first and third region, the source metal layer being exposed in the source opening, the drain metal layer being exposed in the drain opening, and the capacitor top electrode being exposed in the capacitor opening;

(h) using the passivation layer as an etching mask to remove a portion of the semiconductor layer and the second insulating layer uncovered by the passivation layer, to expose the first insulating layer outside the first and third region, so that the pad electrode being exposed in the pad opening.

(i) forming a transparent conductive layer on the substrate and filling in the source opening, the drain opening, the capacitor opening, and the pad opening; and (j) patterning the transparent conductive layer, to separate the transparent conductive layer in to a plurality of electrically isolated parts including a source block, a drain block, and pad block, the source block being electrically connected with the source metal layer via the source opening, the drain block being electrically connected with the drain metal layer via the drain opening, the pad block being electrically connected with the pad electrode via the pad opening, and the capacitor top electrode being electrically connected with the transparent conductive layer.

4. The method of claim 3 wherein the method further comprises:

forming a capacitor insulating layer opening during the step (c) for patterning the first insulating layer in order to expose the capacitor bottom electrode; and filing the second insulating layer into the capacitor insulating layer opening during the step (d).

5. A thin film transistor display comprising:

a substrate;

a thin film transistor, the thin film transistor comprising:
 a gate electrode formed on the substrate;
 a transistor insulating layer and a transistor semiconductor layer formed on the gate electrode;
 a first doped silicon layer and a second doped silicon layer formed on the transistor semiconductor layer, and a channel area is defined between the first and second doped silicon layers;
 a source metal layer formed on the first doped silicon layer;
 a drain metal layer formed on the second doped silicon layer; and
 a transistor passivation layer covering the channel area, the source conductive layer, and the drain conductive layer; and a gate pad comprising:
 a pad electrode formed on the substrate and electrically connected to the gate electrode;
 a pad insulating layer surrounding the boundary of the pad electrode to form a pad opening;
 the pad opening penetrating through the pad insulating layer to expose the pad electrode;

wherein the sidewalls of the transistor insulating layer and the semiconductor layer are aligned, and the sidewalls of the source metal layer and the first doped silicon layer are aligned.

6. The thin film transistor display of claim 5 wherein the sidewall of the source metal layer spaces apart from the sidewall of the transistor insulating layer.

7. The thin film transistor display of claim 5 wherein the passivation layer comprises a source opening above the source metal layer and a drain opening above the drain metal layer, the thin film transistor display further comprises:
   a transparent source conductive layer block electrically connected with the source metal layer via the source opening;
   a transparent drain conductive layer block electrically connected with the drain metal layer via the drain opening; and
   a transparent pad conductive layer block electrically connected with the pad electrode via the pad opening.

8. The thin film transistor display of claim 7 wherein the thin film transistor display further comprises a capacitor, and the capacitor comprises:
   a capacitor bottom electrode in common with the gate electrode;
   a first insulating layer covering the capacitor bottom electrode; and
   a transparent conductive layer covering the first insulating layer.

9. The thin film transistor display of claim 7 wherein the thin film transistor display further comprises a capacitor having:
   a capacitor bottom electrode in common with the gate electrode;
   a first insulating layer covering the capacitor bottom electrode;
   a second insulating layer and a semiconductor layer formed on the first insulating layer;
   a doped silicon layer, a capacitor top electrode, and a capacitor passivation layer formed on the semiconductor layer, the capacitor passivation layer comprising a capacitor opening to expose the capacitor top electrode; and
   a transparent conductive layer covered the first capacitor passivation layer and filling into the capacitor opening for electrically connecting with the capacitor top electrode.

10. The thin film transistor display of claim 9 wherein the first insulating layer in the capacitor comprises a first insulating layer opening to expose the capacitor bottom electrode, and the second insulating layer fills into the first insulating layer opening.

11. A method of fabricating a thin film transistor display, the thin film transistor display being fabricated on a substrate comprising a first region and a second region, the first region having a transistor area for forming a transistor, the second region comprising a pad area for forming a pad, the method comprising the step of:
   (a) depositing a first metal layer on the surface of the substrate;
   (b) patterning the first metal layer to form a gate electrode in the transistor area and a pad electrode in the pad area;
   (c) sequentially depositing an insulating layer, a semiconductor layer, a doped silicon layer, and a second metal layer;
   (d) defining a channel area in the transistor area, removing the portions of the second metal layer and the doped silicon layer positioned (1) within the channel area and outside the transistor area in the first region, and (2) on the second region, a source metal layer and a drain metal layer being formed in the transistor area by the remaining second metal layer, the semiconductor layer being exposed outside the transistor area, and the source and drain metal layers being separated by the channel area;
   (e) depositing a passivation layer on the substrate to cover the transistor area and the pad area, as well as filling in the channel area; and
   (f) patterning the passivation layer, defining a pad opening in the pad area, and then removing the passivation layer positioned (1) outside the first region, and (2) outside the second region and within the pad opening, so that the semiconductor layer being exposed (1) outside the first region and outside the second region, and (2) within the pad opening;
   (g) using the passivation layer as an etching mask, and removing portions of the semiconductor layer and the insulating layer positioned (1) outside the first region, and (2) outside the second region and within the pad opening, such that (1) the substrate being exposed outside the first and second region, and (2) the pad electrode being exposed in the pad opening.

12. The method of claim 11 wherein the method further comprises the following:
   defining a source opening above the source metal layer and a drain, opening above the drain metal layer during the step (f) for patterning the passivation layer, and then removing the passivation layer within the source and drain opening to expose both the source and drain metal layer in the transistor area;
   (h) forming a transparent conductive layer on the substrate, and filling in the source opening, the drain opening, and the pad opening; and
   (i) defining the pattern of the transparent conductive layer to form a plurality of electrically isolated parts including a source block, a drain block, and a pad block, the source block being electrically connected to the source metal layer via the source opening, the drain block being electrically connected to the drain metal layer via the drain opening, and the pad block being electrically connected to the pad electrode via the pad opening.

13. The method of claim 12 wherein the substrate further comprises a third region, the third region including a capacitor area for forming a capacitor, the method further comprises:
   forming a capacitor bottom electrode in the capacitor area during the step (d) for patterning the first metal layer;
   during the step (c), forming the insulating layer, the semiconductor layer, the doped silicon layer, and the second metal layer in the capacitor area;
   during the step (d), in the third region, removing the portions of the second metal layer and the doped silicon layer not covering the capacitor bottom electrode, so that the semiconductor layer being exposed outside the capacitor area and a capacitor top electrode being formed in the capacitor area by the remaining second metal layer;
   during the step (f) for patterning the passivation layer, forming a capacitor opening in the capacitor area to expose the capacitor top electrode; and
   during the step (h), filling the transparent conductive layer into the capacitor opening to electrically connect with the capacitor top electrode.

14. The method of claim 11 wherein the display is an inplain-switch (IPS) type TFT-LCD.

15. The method of claim 11 wherein the semiconductor layer is an amorphous silicon layer or a poly-silicon layer.

16. A thin film transistor display comprising:
   a substrate;
   a thin film transistor, comprising:
      a gate electrode formed on the substrate;
      a transistor insulating layer and a transistor semiconductor layer formed on the gate electrode;
      a first doped silicon layer and a second doped silicon layer formed on the transistor semiconductor layer and separated by a channel area;
      a source metal layer formed on the first doped silicon layer;
      a drain metal layer formed on the second doped silicon layer; and
      a transistor passivation layer covering the channel area, the source metal layer, and the drain metal layer; and
   a gate pad, comprising:
      a pad electrode formed on the substrate and electrically connected to the gate electrode;
      a pad insulating layer, a pad semiconductor layer, and a pad passivation layer surrounding the pad electrode to form a pad opening;
      the pad electrode being exposed in the pad opening since the pad opening penetrating through the pad insulating layer, the pad semiconductor layer, and the pad passivation layer; and
      a conductive layer filling in the pad opening to electrically connect with the pad electrode;
   wherein the sidewalls of the transistor insulating layer and the transistor semiconductor layer are aligned, and the sidewalls of the source conductive layer and the first doped silicon layer are aligned.

17. The thin film transistor display of claim 16 wherein the sidewall of the source metal layer spaces apart from the sidewall of the transistor insulating layer.

18. The thin film transistor display of claim 16, further comprising a capacitor having:
   a capacitor bottom electrode in common with the gate electrode;
   a capacitor insulating layer covering the capacitor bottom electrode;
   a capacitor semiconductor layer, a capacitor doped silicon layer, a capacitor top electrode, and capacitor: passivation layer sequentially formed above the capacitor insulating layer, the capacitor passivation layer comprising a capacitor opening to expose the capacitor top electrode; and
   a transparent conductive layer covering the capacitor passivation layer and filling into the capacitor opening for electrically connecting with the capacitor top electrode.

19. The thin film transistor display of claim 16 wherein the transistor passivation layer comprises a source opening above the source metal layer and a drain opening above the drain metal layer, and the thin film transistor liquid crystal display further comprises:
   a transparent source conductive layer block electrically connected to the source metal layer via the source opening;
   a transparent drain conductive layer block electrically connected to the drain metal layer via the drain opening;
   a transparent pad conductive layer block electrically connected to the pad electrode via the pad opening.

20. A thin film transistor comprising:
   a substrate;
   a gate electrode formed on the substrate;
   an insulating layer and a semiconductor layer formed on the gate electrode;
   a first doped silicon layer and a second doped silicon layer, separated by a channel area, formed on the semiconductor layer;
   a source metal layer and a drain metal layer respectively formed on the first doped silicon layer and second doped silicon layer; and
   a passivation layer covering the channel area, the source conductive layer, and the drain conductive layer;
   wherein the sidewalls of the insulating layer and the semiconductor layer are aligned, and the sidewalls of the source metal layer and the first doped silicon layer are aligned.

21. The thin film transistor of claim 20 wherein the sidewall of the source metal layer spaces apart from the sidewall of the insulating layer.

22. The thin film transistor of claim 20 wherein the passivation layer comprises a drain opening to expose the drain metal layer.

23. The thin film transistor of claim 22 wherein the thin film transistor further comprises a transparent electrode formed above the passivation layer and filled into the drain opening to electrically connect with the drain metal layer.

24. A method of fabricating a thin film transistor display, the thin film transistor display being fabricated on a substrate, the substrate comprising a first region, and a second region, the first region comprising a transistor area for forming g a transistor and the second region comprising a pad area for forming a pad, the method comprising steps of:
   (a) depositing a first metal layer on the surface of the substrate;
   (b) defining the pattern of the first metal layer to form a gate electrode in the transistor area and a pad electrode in the pad area;
   (c) sequentially forming a first insulating layer, a second insulating layer, a semiconductor layer, a doped silicon layer, and a second metal layer on the substrate;
   (d) defining a channel area in the transistor area, and removing the portions of the second metal layer and the doped silicon conductive layer (1) within the channel area and (2) outside the transistor area, such that a source metal layer and a drain metal layer being formed by the remaining second metal layer, the source and drain metal layers being separated by the channel area, and the semiconductor layer being exposed outside the transistor area;
   (e) depositing a passivation layer on the substrate; and
   (f) defining the pattern of the passivation layer, and removing the passivation layer outside the first region for allowing the semiconductor layer being exposed outside the first region, and then by using the passivation layer as an etching mask to remove the unprotected portions of the semiconductor layer and the second insulating layer, so that the first insulating layer being exposed outside the first region; and (g) patterning the first insulating layer to form a pad opening in the pad area, and the pad electrode being exposed in the pad opening.

25. The method of claim 24 wherein the substrate further comprises a capacitor area for the formation of a capacitor, the method further comprises:

forming a capacitor bottom electrode in the capacitor area in the step (b) of patterning the first metal layer; during the step (f) of patterning the passivation layer, forming a source opening above the source metal layer and a drain opening above the drain metal layer, and removing the passivation layer within the source and drain opening so that the source and drain metal layers being exposed in the transistor area, and the first insulating layer being exposed in the transistor area;

(h) forming a transparent conductive layer on the substrate to cover the capacitor area, and fill into the source opening, the drain opening, and the pad opening; and (i) patterning the transparent conductive layer to separate the transparent conductive layer into a plurality of electrically isolated parts including a source block, a drain block, and a pad block, a capacitor top electrode being also formed in the capacitor area, the source block being electrically connected to the source metal layer via the source opening, the drain block being electrically connected to the drain metal layer via the drain opening, and the pad block being electrically connected to the pad electrode via the pad opening.

* * * * *